US007664483B2

(12) United States Patent
Annoni et al.

(10) Patent No.: US 7,664,483 B2
(45) Date of Patent: Feb. 16, 2010

(54) METHOD AND SYSTEM FOR IDENTIFICATION AND REGISTRATION OF A MOVING OBJECT ENTERING A PRE-DETERMINED AREA, RELATED NETWORK AND COMPUTER PROGRAM PRODUCT THEREFOR

(75) Inventors: Marco Annoni, Turin (IT); Antonio Ascolese, Turin (IT); Nicoletta Salis, Turin (IT)

(73) Assignee: Telecom Italia S.p.A., Milan (IT)

( * ) Notice: Subject to any disclaimer, the term of this patent is extended or adjusted under 35 U.S.C. 154(b) by 476 days.

(21) Appl. No.: 10/584,081

(22) PCT Filed: Dec. 23, 2003

(86) PCT No.: PCT/EP03/14770

§ 371 (c)(1),
(2), (4) Date: Jun. 22, 2006

(87) PCT Pub. No.: WO2005/064544

PCT Pub. Date: Jul. 14, 2005

(65) Prior Publication Data

US 2007/0146163 A1 Jun. 28, 2007

(51) Int. Cl.
*H04M 11/00* (2006.01)
*G08G 1/14* (2006.01)
*G08G 1/01* (2006.01)

(52) U.S. Cl. .................... 455/406; 340/932.2; 340/934; 340/935

(58) Field of Classification Search ................. 455/406, 455/11.1; 705/34; 701/29, 211; 340/937; 342/104
See application file for complete search history.

(56) References Cited

U.S. PATENT DOCUMENTS 5,812,070 A 9/1998 Tagami et al.

(Continued)

FOREIGN PATENT DOCUMENTS

WO WO 99/33027 7/1999

(Continued)

*Primary Examiner*—Charles N Appiah
*Assistant Examiner*—Kiet Doan
(74) *Attorney, Agent, or Firm*—Finnegan, Henderson, Farabow, Garrett & Dunner, L.L.P.

(57) ABSTRACT

A method for identification and registration of a moving object, entering a pre-determined area to be monitored. The identification operation has interaction between the moving object and an area access system associated with the predetermined area and including supplying identification information, while the registration operation is carried out over a wireless communication link to a control center. The method further includes identifying the moving object through a mutual interaction between the moving object and the area access system, the mutual interaction being performed over a wireless short range communication link, preferably a Bluetooth wireless link; and performing the registration operation by establishing a wireless communication link of the long-range type between the moving object and the control center upon activation of the mutual interaction on the wireless short range communication link. Preferred application is safety monitoring of tunnels.

33 Claims, 4 Drawing Sheets

U.S. PATENT DOCUMENTS

Figure 1:
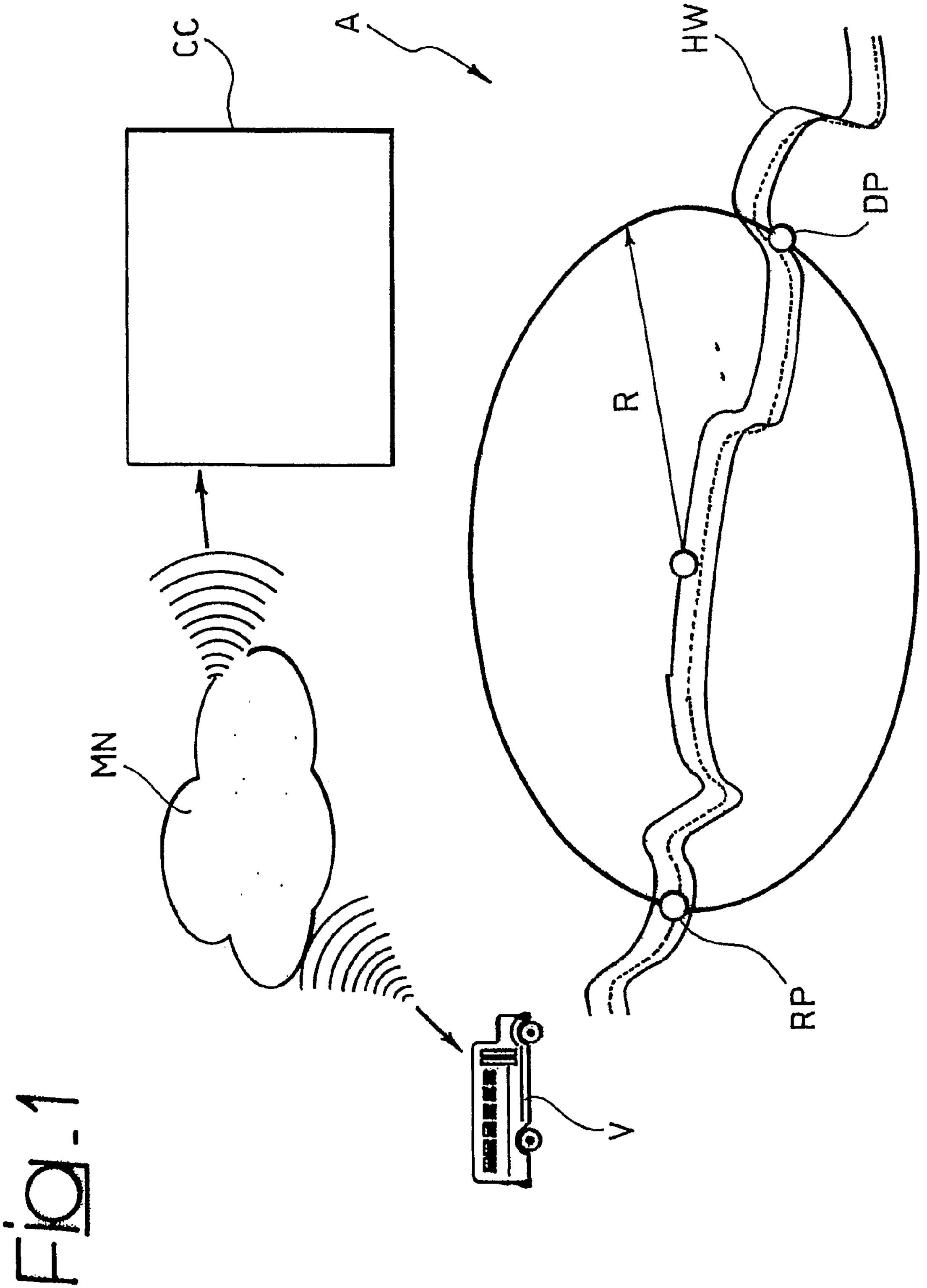

| | | | | |
|---|---|---|---|---|
| 5,857,152 | A * | 1/1999 | Everett | 455/406 |
| 6,042,008 | A | 3/2000 | Ando et al. | |
| 6,567,501 | B1 | 5/2003 | Pernu et al. | |
| 2001/0007815 | A1 | 7/2001 | Philipsson | |
| 2002/0032506 | A1* | 3/2002 | Tokitsu et al. | 701/29 |
| 2003/0043021 | A1 | 3/2003 | Chung | |
| 2004/0267645 | A1* | 12/2004 | Pollari | 705/34 |

FOREIGN PATENT DOCUMENTS

| | | |
|---|---|---|
| WO | WO 01/08105 | 2/2001 |
| WO | WO 01/11571 | 2/2001 |
| WO | WO 01/11572 | 2/2001 |
| WO | WO 01/84503 | 11/2001 |

* cited by examiner

METHOD AND SYSTEM FOR IDENTIFICATION AND REGISTRATION OF A MOVING OBJECT ENTERING A PRE-DETERMINED AREA, RELATED NETWORK AND COMPUTER PROGRAM PRODUCT THEREFOR

CROSS REFERENCE TO RELATED APPLICATION

This application is a national phase application based on PCT/EP2003/014770, filed Dec. 23, 2003, the content of which is incorporated herein by reference.

FIELD OF THE INVENTION

The present invention relates to techniques for communicating between a moving object, e.g. a vehicle, and a control center.

DESCRIPTION OF THE RELATED ART

Current known systems enabling Communication between a moving object, e.g. a vehicle, and a control center such as a remote control center mainly focus on the importance of transferring data from the vehicle towards the control center.

Such known systems only marginally tackle the problem of detecting and registering in a thoroughly automated way the entrance of the vehicle into a pre-determined area, such as an emergency monitoring area or a parking area, or, more in general, any area where a monitoring function is needed.

For instance, U.S. patent application 2003/0043021A1 discloses a system for automatically opening and closing a garage door that requires a communication of the vehicle/client identifier to a garage/server module, but not vice versa.

Similarly, U.S. Pat. No. 5,812,070 discloses a shared vehicle rental system where a pre-determined area is monitored through a control center for supervising motor vehicles in a parking area. The control center monitors the vehicles by means of a GPS location system, so they cannot leave the monitoring area. This system still requires manual identification and registration operations, performed by inserting a specific card in a card reader.

From U.S. Pat. No. 6,567,501, a system for transmitting alarms is known providing wireline monitoring of a pre-determined area.

Essentially, in the prior art arrangements considered in the foregoing, at least one of the two entities mainly involved in the communication, i.e. the vehicle and the control center, is somewhat bound to "a priori" knowledge of some features or parameters of the other entity.

In addition, known systems do not allow for establishing, automatically, bi-directional and complex communication between the vehicle and the control center. Specifically, GPS-based solutions do not allow the control center to understand, in a reliable way, if the vehicle has really entered the pre-determined area. Thus, it is not possible to reliably register a vehicle approaching a pre-determined area, such as urban areas where reception of GPS signals may be interrupted or exposed to severe limitations. Also, by such systems, it is not possible to detect a vehicle entering a predetermined area, independently from maps pre-loaded on the vehicle. Maps, by definition, are strictly related to variable parameters (e.g., orographic, road, urban).

OBJECT AND SUMMARY OF THE INVENTION

The need therefore exists of providing an arrangement adapted to overcome the intrinsic drawbacks of the prior art considered in the foregoing.

Specifically, the need is felt for an arrangement where, i.a.:

it is possible to identify and register in a fully reliable, automatic way a vehicle entering a pre-determined area;

identification and registration operation are performed without requiring with either of the two entities involved in the communication "a priori" knowledge of any characteristics and parameters of the other entity;

bi-directional and complex communication between the vehicle and the control center can be established in an automatic way;

the control center is able to reliably and securely detect if the vehicle has entered the pre-determined area;

identification and registration operations are independent of maps that are pre-loaded on the vehicle or other instruments that are related to variable parameters, in particular related to the territory conformation.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention.

In brief, the basic idea underlying the invention is to identify and register in an automatic way a moving object, i.e. a vehicle, entering a pre-determined area by means of a mutual identification operation between the vehicle and the area access system. Such an identification operation is carried out over a wireless short range communication link (e.g. Bluetooth wireless link) and operates as an automatic trigger for a complete moving object registration operation, that involves exchanging further parameters.

Preferably, such registration operation is subsequently completed by the moving object by establishing a wireless long-range communication link (e.g. GPRS). Thus, a remote control center can communicate with the moving object according to the needs established by different applications (e.g., continuous monitoring for safety reasons, anti-theft systems, safe car parkings, etc. . . . ).

A de-registration procedure for discontinuing the monitoring operations of a moving object exiting the predetermined area is also disclosed.

BRIEF DESCRIPTION OF THE ANNEXED DRAWINGS

Figure 2:
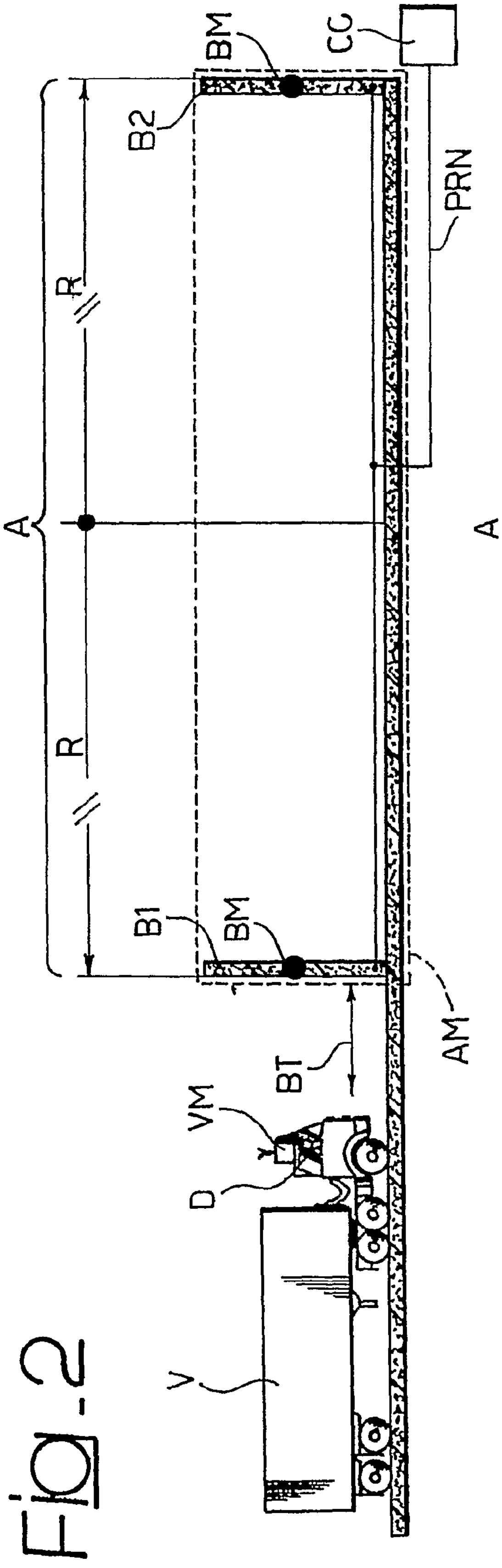
Figure 3:
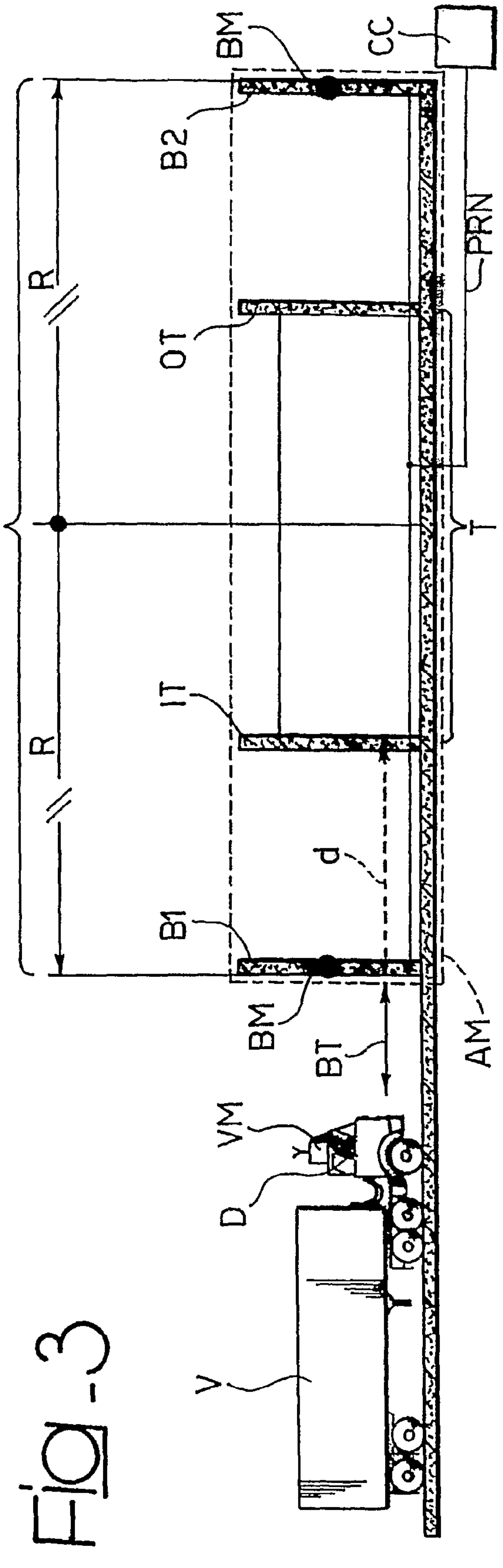
Figure 4:
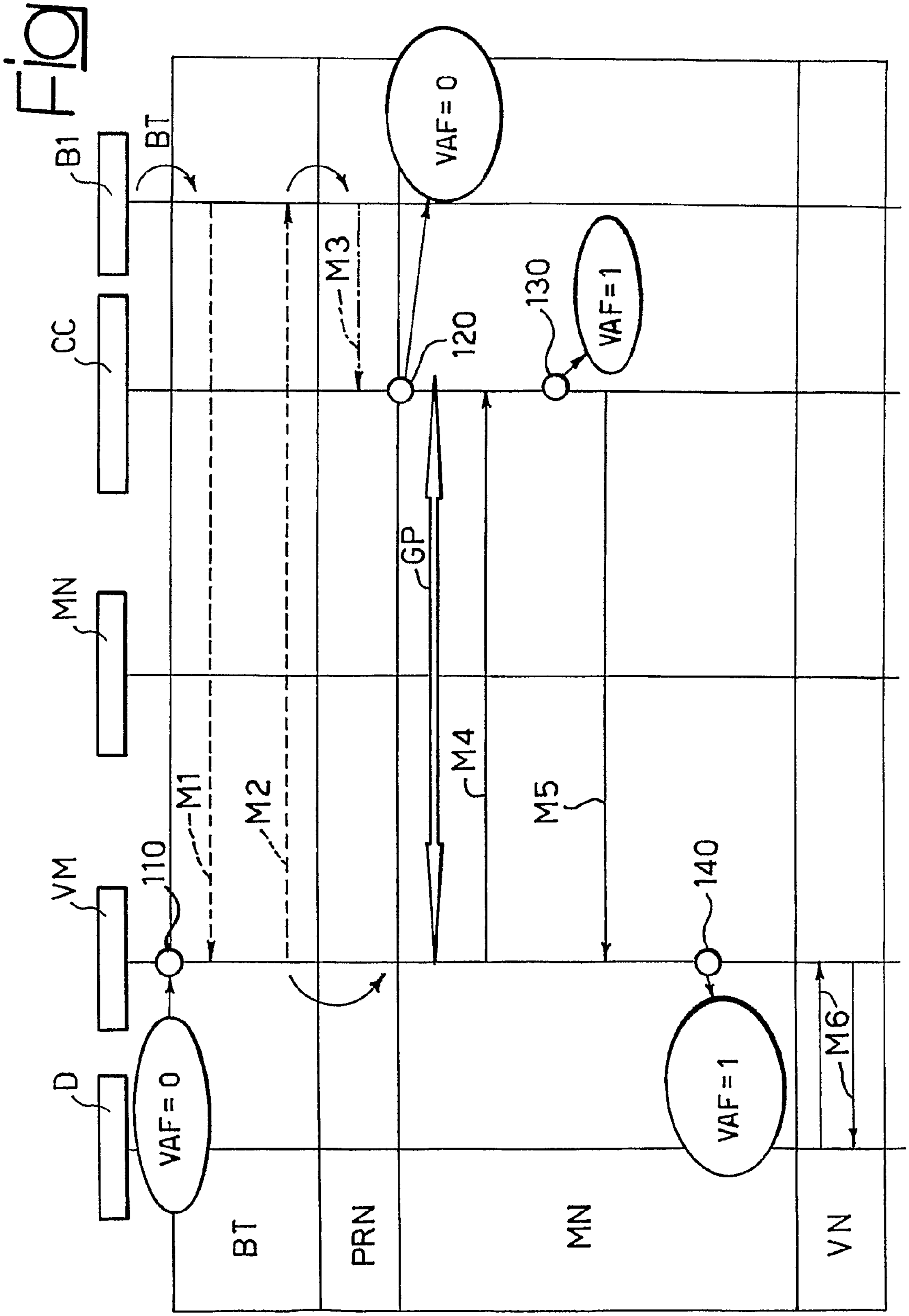
Figure 5:
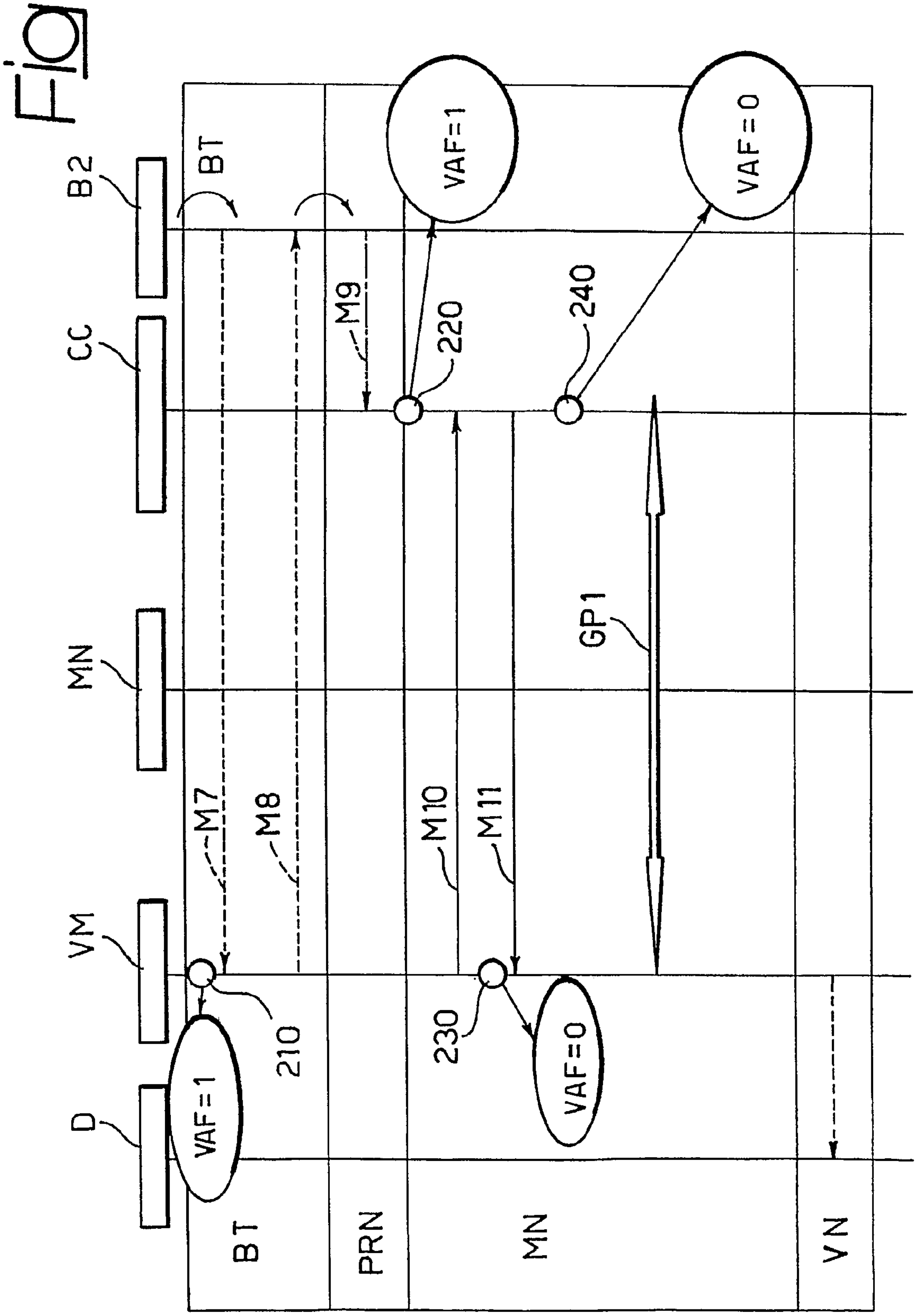

The invention will now be described, by way of example only, by referring to the enclosed figures of drawing, wherein:

FIG. 1 is a schematic representation of a typical context of use of the arrangement described herein, FIG. 2 is a further schematic representation of the context of use of the arrangement described herein, and FIG. 3 is a schematic representation of a preferred context of use of the arrangement described herein, and FIGS. 4 and 5 are charts exemplary of possible operation of the arrangement described herein.

DETAILED DESCRIPTION OF PREFERRED EMBODIMENTS OF THE INVENTION

As indicated, FIG. 1 is a schematic representation of a context of use of the proposed method and system for identification and registration of a moving object entering into a pre-determined area.

Specifically, a monitored area A of circular shape and radius R is considered, for the sake of simplicity. It will however be apparent that the geometric conformation, i.e. shape and extension, of the area A to be monitored do not represent any limitations for the invention and will strictly depend on the topography of the specific application context (highway network, urban/extra-urban areas, car parkings and so on).

In FIG. 1 two points are indicated that correspond to two critical events in the monitoring of a vehicle V moving on a road HW crossing the area A:

- a registration point RP, where the entrance of the vehicle V in the monitored area A is detected: such a registration point RP defines the point at which the vehicle V starts to be monitored by a control center CC begins;
- a de-registration point DP, where the vehicle V exiting the monitored area A is detected: such a de-registration point DP defines the point at which the control center CC discontinues monitoring the vehicle V.

Although the following description will describe in detail an arrangement using a single couple of registration/deregistration points, as shown in FIG. 1, any number of registration and/or deregistration points can be associated to the monitored area A. Advantageously these points are arranged at any "border crossing" of the monitored area that is accessible to vehicles V.

A new vehicle V entering the monitored area A, as better detailed in FIG. 2, needs the definition of a specific registration procedure in order to recognize and control each vehicle V passing in the monitored area A through the registration point RP.

According to the method described herein, a trigger event for starting the registration operation is used: such a trigger event is based on the occurrence of a communication with the vehicle V on a short range communication link BT.

In a preferred embodiment, such a short range communication link BT is a wireless link according to the Bluetooth wireless standard, preferably according to the Bluetooth 1.1 standard version.

In that way, data exchange between an on-board system devoted to communication and control, in the following referred as vehicle module VM, on the vehicle V, and the control center CC is driven by the control center CC itself. In fact, as it will be better detailed in describing FIG. 2, an area access system AM, including access barriers B1 and B2, is available in the area A. The AM, as a whole, can be regarded as an extension of the control center CC itself. The area access system AM detects, through the Bluetooth link BT, the entrance of the vehicle V and, as it will be better detailed in the following, communicates such an event to the control center CC; thus the identification operation is driven through the area access system AM and the control center CC that can be regarded as a single infrastructure.

This means that the control center CC identifies and registers the vehicle V as the vehicle V approaches a first access point or barrier B1, placed at the registration point RP in the area A (see FIG. 2), and de-registers the vehicle V as this approaches a second point or barrier B2, placed at the de-registration point DP in the monitored area A.

In that way, the control center CC can evaluate, in a reliable way, if the vehicle V has really entered the monitored area A.

Obviously, referring to points B1 and B2 as "barriers" is only dictated by these usually bearing some sort of similarity to entrance barriers or gates providing access to e.g. motorways. It will be appreciated that no provision will be generally contemplated at points B1 and B2 to prevent or restrict access of vehicles to the monitored area. In the case points B1 and B2 are arranged as entrance barriers, however, they could be arranged not unlike access gates configured for automatic toll collection in motorways, exploiting the available Bluetooth link also for automatic toll collection functions.

The barriers B1 and B2 are preferably equipped with a Bluetooth module BM in order to establish the short range communication link BT and communicate with the approaching vehicle V. Preferably, such Bluetooth module BM has a range of the order of 100 m, in order to let the vehicle V approach the access barrier B1 or B2 at an appropriate speed.

The Bluetooth module BM establishes such a short range communication link BT by performing the so-called 'inquiry procedure' according to the Bluetooth standard. Such an 'inquiry procedure' enables a Bluetooth unit to discover which Bluetooth units are in range, and what their device addresses and clocks are. With a paging procedure, an actual connection can be established. Only the Bluetooth device address is required to set up a connection, although knowledge about the clock will accelerate the setup procedure. A unit that establishes a connection will carry out a page procedure and will automatically become the master of the connection.

Once established, such short range communication link BT will permit mutual identification between the vehicle V and the control center CC through the area access system AM of the monitored area A, that includes the access barriers B1 and B2 and also a private network PRN.

The data exchange occurring on the short range communication link BT also operates as an automatic trigger for a complete vehicle registration operation, which is subsequently completed by the vehicle V by establishing a wireless long range communication link LT with the control center CC by means of a public mobile network MN, e.g. the GPRS mobile network.

The proposed method is intended to be carried out by any properly equipped vehicle, and the vehicle V will thus establish the long range communication link LT towards the remote control center CC, and not vice versa.

In order to do this the vehicle V receives on the short range communication link BT on the first barrier B1 an identifier for establishing a connection with a control center.

As better detailed in the following, such an identifier preferably comprises a control center identifier TCC_ID and TCP address of the control center CC, indicated with the reference TAT.

In general, a TCP identifier is not associated with the vehicle V until such a vehicle V establishes the long range communication link LT with the control center CC and receives such a TCP/IP identifier from the public mobile network MN, that is a GPRS network.

In the following, an embodiment of the proposed method will be detailed with reference to the possible application to monitor vehicular traffic in road tunnels.

In FIG. 3 a tunnel T is shown included in a monitored area A.

An entrance IT of the tunnel T and an exit OT of the tunnel T are shown in FIG. 3, placed at (not necessarily identical) distances d from the first barrier B1 and from the second barrier B2 respectively. The distance d has to be sufficient to ensure that the vehicle V is registered and consequently monitored before entering the tunnel T.

The entrance IT and exit OT of the tunnel T can be equipped with Bluetooth modules BM as well, in order to operate as intermediate barriers, detecting the passage of the vehicle V and supplying to the control center CC an information about its position. In this case, however, no further complete registration procedure has to take place, only a notification operation including identification of the vehicle V and of the relevant barrier, and the corresponding information is thus transmitted, e.g. on the long range link LT, to the control center CC that, in this way, is able to know that a certain vehicle V is passed by a certain barrier, e.g. the entrance point IT, at a certain time.

It will be readily appreciated that such an architecture, comprising in a monitored area entrance barriers and exit barriers for performing registration and de-registration of vehicles, and further comprising intermediate barriers signaling the passage of the registered vehicle can be applied to different monitoring services where it is needed to obtain an information about the passage of the vehicle through defined check points.

The road tunnel monitoring application, on the other hand, specifically requires introduction of some parameters suitable for preventing or reducing accidents within road tunnels, as better detailed in the following. Besides data communication between the control center CC and the vehicle V, in the embodiment described herein the possibility is also provided for a driver D on the vehicle V to place a voice call to the control center CC. Such an option requires that the phone numbers of the control center CC and of the vehicle V are also exchanged.

In FIG. 4 a message sequence chart is shown, that illustrates the exchange of messages between the different entities involved in the proposed method. The message sequence chart of FIG. 4 specifies when and how an entity sends a message to the other entity and define the fields of the messages.

The application protocol between the vehicle V and the control center CC is based on a TCP/IP protocol; such a protocol ensures communication reliability, mainly because of the presence of acknowledgement messages. In addition, the so-called TCP/IP socket, i.e. the co-presence of TCP port information and IP address, is especially suitable for being part of a vehicle identifier VID for each vehicle V, once the GPRS connection is established between the vehicle V and the control center CC and TCP/IP socket is assigned to the vehicle module VM by the public mobile network MN. Such a vehicle identifier VID is then stored in a database at the control center CC.

The vehicle registration procedure will now be described.

When the vehicle V enters the monitored area A, the registration procedure is activated through a mutual identification operation set up automatically between the area access system AM and the vehicle V, performed by means of the short range link BT using the Bluetooth module BM.

In order to establish the long range connection link LT with the control center CC, the vehicle V has to know, i.e. receive, the IP address of the control center CC. Such an IP address is communicated to the vehicle V, as a TCP address of the control center TAT, through the short range communication link BT from the area access system AM, i.e. the access barrier B1.

As already mentioned, in general the control center CC does not know in advance the IP address that is part of the vehicle identifier VID, that is assigned dynamically by the GPRS network which embodies the public network MN. Thus the vehicle V establishes the long range connection link LT and obtains an address, assigned by the public network MN, that is inserted in its vehicle identifier VID, that is then communicated to the control center CC.

In the chart of FIG. 4, reference PRN designates the private network, that is the wireline network linking all the infrastructures of the control center CC, i.e. barriers, computers, mainframes: such a private network PRN can be carried out in many known different ways and it will be not further described.

Reference VN designates a vehicle network that is a network provided on board the vehicle V for exchanging messages from/to the control center CC directly to/from the driver D: also in this case such a vehicle network VN can be carried out in many known different ways and it will be not further described.

Reference GP indicates a GPRS connection setup. Such a GPRS connection setup GP includes registering the vehicle module VM on the public mobile network MN, thus obtaining a TCP/IP address to be used as a vehicle identifier VID.

Reference VAF denotes a vehicle area flag parameter, i.e. a status parameter and performs the function of indicating if the vehicle V is located inside or outside the monitored area A; the value of the vehicle area flag parameter VAF is updated both at the vehicle V side and at the control center CC side.

The registration procedure operates as follows:

in a step 110, corresponding to the vehicle V traveling outside the monitored area A, the parameter VAF stored in the vehicle module VM is set to "0" value and a tunnel_position parameter TPP is set to "OUT" by default;

when the vehicle V approaches the access barrier B1, and enters the range of the short range communication link BT enabling interaction between the vehicle V and the barrier B1, a mutual identification operation is automatically triggered and the access barrier B1 at the registration point RP sends an on board device identification request message M1 to the vehicle module VM. Such a request message M1 has the following syntax: [Message type, TCC_ID, AB_ID, TAT], where TCC_ID indicates a control center identifier, AB_ID indicates an access barrier identifier and TAT, the TCP address of the control center CC, i.e. the socket of the control center CC, including TCP port number and IP address;

the vehicle module VM performs the GPRS connection setup GP in FIG. 4, on the long range communication link LT through the public mobile network MN and, in the meanwhile, sends an on board device identification response message M2 to the access barrier B1. Such a response message M2 has the following syntax: [Message type, VID, TCC_ID, AB_ID, TAT, VAF(0)] where VID indicates the vehicle identifier, including the TCP address obtained from the public mobile network MN, and the vehicle area flag parameter VAF, set to zero in a step 120, indicates that the vehicle V is an incoming vehicle;

the on board device identification response message M2 operates as the trigger used by the access barrier B1 to send a vehicle parameters message M3 to the control center CC through the private network PRN. The syntax of the vehicle parameters message M3 is [VID, AB_ID, VAF(0)];

after the GPRS connection setup GP, the vehicle module VM sends a registration request message M4 to the control center CC including the data useful to identify and contact the vehicle V, for example in case of alarm. Thus the syntax of the registration request message M4 is [Message type, VID, plate number, . . . , vehicle_phone_number, . . . ] where information relating to the vehicle V like plate number and vehicle phone number is also supplied;

upon receipt of the registration request message M4 the control center CC sends a registration response message M5 to the vehicle module VM on board the vehicle V. The registration response message has the syntax [Message type, VAF(1), CC_phone_number, MAP, PGS, access_denied flag (Y/N)], thus including a position flag parameter VAF; the PGS parameter, that indicates data, such as air temperature inside/outside the tunnel and road slope, useful for prognostic purposes; an access flag parameter access_denied_flag that indicates if the access to the tunnel T is allowed or not. The vehicle area flag parameter VAF, set to '1 ' in a step 130 before sending the registration response message M5, in this case, when it is evaluated at the vehicle module VM, in a subsequent step 140, indicates if the vehicle module VM have to keep or cancel the data pertaining the control center CC. A field MAP is also supplied that includes data about tunnel shelter position and availability.

finally, on-board information messages M6 are exchanged between the vehicle module VM and the driver D, in order to set parameters such as the driver language and to notify to the driver D the accomplished registration.

Should the GPRS connection on the long range link LT be terminated, the control center CC would lose the information about the socket of the vehicle V. It is not certain to maintain the same socket in the following attempt to re-establish the GPRS connection. However, a GPRS connection breakdown is not associated to a complete de-registration procedure, because the vehicle area flag parameter VAF maintains its value equal to "1" and, thus, the vehicle V can keep in its vehicle module VM memory the control center CC data, e.g. its TCP address, whereas, at the same time, the control center CC can keep the vehicle data as well. As a consequence, only the GPRS setup procedure, i.e. GP operation and M4 and M5 messages, on the long range communication link LT has to be repeated and not the complete identification and registration procedure.

As regards the message format of the registration procedure, every message M1, M2, M3, M4, M5 or M6 shown in FIG. 4 is made of a record containing fields, as reported in the following Tables 1 to 4.

The first field is named Command Length and represents the length in bytes of the message. This information is used to read the message from the input stream.

The second field is named Message Type and identifies the message received.

The other fields encode the data transmitted between the vehicle V and the control center CC.

Each field can be encoded in a fixed length format or in a variable length format.

As regards the parameters type definition, all messages are composed by an organized set of parameters.

These parameters can have the format described in the following:

Integer: is used to encode numbers and is an unsigned integer value, which can be 1, 2, 4 octets in size. The octets are always encoded in Most Significant Byte first order. A 1-octet integer with value 5, would be encoded in a single octet with the value 0x05. A 2-octet integer with the decimal value of 41746 would be encoded as 2 octets with the value 0xA312

C-Octet String: is used to encoded variable length strings. A C-Octet String is a sequence of ASCII characters terminated with a NULL octet (0x00). The string "Hello" would be encoded in 6 octets (5 characters of "hello" and NULL octet) as follow:

0x48656C6C6F00

Octet String: is used to encode fixed length strings. An Octet String is a sequence of octets not necessary terminated with a NULL octet. Such fields using Octet String encoding, typically represent fields that can be used to encode raw binary data. In all circumstances, the field will be either a fixed length field or explicit length field where another field indicates the length of the Octet String.

The format of the parameters are chosen according to GTP specification (Global Telematics Protocol).

The format of the messages exchanged between the vehicle V and the tunnel control center CC will be now described.

The sequence of the parameters in a message is fixed.

In Table 1 the parameters of the on board device identification request message M1 for each field of the message are shown. The columns indicates respectively the Field Name, the size of the octets, the type of the field and the description of the field:

TABLE 1

| Field Name | Size octets | Type | Description |
|---|---|---|---|
| Command Length | 2 | Integer | Define the overall length of the identification_request message |
| Message type | 4 | Integer | 0x00010001 |
| TCC_Id | 2 | Integer | Tunnel Control Center Identifier |
| AB_Id | 2 | Integer | Access Barrier Identifier |
| TCP_addr_TCC (TAT) | 6 | Integer | IP address: 4 octets Port Number: 2 octets |

In Table 2 the parameters of the on board device identification response message M2 are shown:

TABLE 2

| Field Name | Size octets | Type | Description |
|---|---|---|---|
| Command Length | 2 | Integer | Define the overall length of the identification response message |
| Message type | 4 | Integer | 0x00020001 |
| VID | Var | C-Octet string | Vehicle Identifier |
| TCC_Id | 2 | Integer | Tunnel Control Center identifier |
| AB_Id | 2 | Integer | Access Barrier Identifier |
| TCP_addr TCC (TAT) | 6 | Integer | IP address: 4 octets Port Number: 2 octets |
| VAF | 1 | Integer | 0: vehicle outside Safe Tunnel Area T 1: vehicle inside Safe Tunnel Area T I: vehicle inside intermediate area |

It must be noted from Table 2 that an optional range of values I can be assigned to the vehicle area flag parameter VAF in case detection of vehicle passage at intermediate barriers is also provided. Such an optional range values I is used for indicating that an intermediate barrier is approached and, thus, no de-registration operation has to take place.

In Table 3 the parameters of the registration request message M4 parameters are shown:

TABLE 3

| Field Name | Size octets | Type | Description |
|---|---|---|---|
| Command Length | 2 | Integer | Define the overall length of the registration__request message |
| Message type | 4 | Integer | 0x00030001 |
| VID | Var | C-Octet String | Vehicle Identifier |
| Vehicle phone number | 16 | Octet String | Phone number of the vehicle in international coding scheme (+390116823456) Number is coded in packed decimal format (two digit for each byte) according the following scheme: 0x0-0x9: digits 0-9 0xA: * 0xB: # 0xC: + 0xF: padding for unused places |

In Table 4 the parameters of the registration response message M5 are shown:

TABLE 4

| Field Name | Size octets | Type | Description |
|---|---|---|---|
| Command Length | 2 | | Define the overall length of the registration__response message |
| Message type | 4 | Integer | 0x00040001 |
| VAF | 1 | Integer | 0: vehicle outside Safe Tunnel Area T 1: vehicle inside Safe Tunnel Area T I: vehicle inside intermediate area |
| TCC Phone Number | 16 | Octet String | Phone number of the TCC in international coding scheme (+390116823456) Number is coded in packed decimal format (two digit for each byte) according the following scheme: 0x0-0x9: digits 0-9 0xA: * 0xB: # 0xC: + 0xF: padding for unused places |
| Access Denied Flag | 1 | Integer | 0: denied 1: accepted |
| MAP | Var | C-Octet String | Shelter/runway direction |

TABLE 4-continued

| Field Name | Size octets | Type | Description |
|---|---|---|---|
| PGS | Var | C-Octet String | Prognostic feature data |

The de-registration procedure is activated when the vehicle V exits the monitored area A, approaching the de-registration point DP. Also in this case the trigger for the de-registration procedure is performed by a Bluetooth module BM at the barrier B2. The vehicle parameters are exchanged between the access barrier B2 and the control center CC by means of the private network PRN; as in the registration procedure, the de-registration is carried out by the infrastructure including the control center CC and area monitoring system AM.

After the vehicle data have been received from the access barrier B2 (meaning that the vehicle V is leaving the monitored area A), the control center CC waits for a de-registration request message coming from the vehicle before starting the actual deregistration procedure. After having received it, the CC sets the vehicle area flag parameter VAF to '0' and triggers the GPRS de-registration procedure through a de-registration response message. The GPRS connection breakdown is carried out by the vehicle V at the end of the de-registration procedure.

In FIG. 5 a message chart is shown, illustrating the vehicle de-registration procedure messages between vehicle V and control center CC.

More specifically:

the vehicle area flag VAF in a step 210 is set to 1, signaling outgoing vehicle. The access barrier B2 sends, after the trigger on the short-range link BT, an on board device identification request message M7 with the syntax [Message Type, CC ID, AB_ID, TCP_addr_CC].

the vehicle module VM reply with a on board device identification response message M8 having the syntax [Message type, VID, CC ID, AB_ID, TCP_addr_CC, VAF (0)];

the on board device identification response message M8 in used also as trigger to send a vehicle parameters message M9, having the syntax [VID, AB_ID, VAF(1)] from the access barrier B2 to the control center CC on the private network PRN. The vehicle area flag VAF in a step 220 is checked at the control center CC to be set to "1" from previous step 210, thus indicating that the vehicle V is exiting the monitored area A.

the vehicle module VM starts the de-registration procedure sending a de-registration request message M10, having the syntax [Message Type, VAF(0)] to the control center CC. The vehicle area flag parameter VAF is now set to "0" in a step 230, indicating to the control center CC to cancel the vehicle data;

the control CC reply at the vehicle module request with a de-registration response message M11 having the syntax [Message Type]. The vehicle area flag parameter VAF, set to zero in the step 230 preceding message M11, is evaluated in a step 240 and indicates to the vehicle module VM to cancel the CC data. Then a GPRS connection termination operation, indicated with the reference GP1 in FIG. 5, is performed and, optionally, selected information messages M12 are exchanged between the vehicle module VM and the driver D in order to notify the accomplishment of the de-registration operation.

For what concerns the message format of the de-registration procedure, this substantially corresponds to the format of the messages of the registration procedure.

In table 5 the parameters of the on board device identification request message M7 are shown:

TABLE 5

| Field Name | Size octets | Type | Description |
|---|---|---|---|
| Command Length | 2 | Integer | Define the overall length of the identification_request message |
| Message type | 4 | Integer | 0x00010002 |
| Tcc_id | 2 | Integer | Tcc_identifier |
| Access Barrier Id (ABD) | 2 | Integer | Access Barrier Identifier |
| TCP address TCC (TAT) | 6 | Integer | IP address: 4 octets Port Number: 2 octets |

In table 6 the parameters of the on board device identification response message M8 are shown:

TABLE 6

| Field Name | Size octets | Type | Description |
|---|---|---|---|
| Command Length | 2 | Integer | Define the overall length of the identification_request message |
| Message type | 4 | Integer | 0x00020002 |
| VID | Var | C-Octet string | Vehicle Identifier |
| Tcc_id | 2 | Integer | Tcc_identifier |
| TCP address TCC (TAT) | 6 | Integer | IP address: 4 octets Port Number: 2 octets |
| VAF | 1 | Integer | 0: vehicle outside the Safe Tunnel Area 1: vehicle inside the Safe Tunnel Area I: vehicle inside intermediate area |

Also in this case, a range of values I for the vehicle area flag parameter VAF is available, in order to indicate if the barrier approached is an intermediate barrier and, thus, de-registration must be hindered.

In table 7 the parameters of the de-registration request message M10 are shown:

TABLE 7

| Field Name | Size octets | Type | Description |
|---|---|---|---|
| Command Length | 2 | Integer | Define the overall length of the registration_request message |
| Message type | 4 | Integer | 0x00030002 |
| VAF | 1 | Integer | 0: vehicle outside the Safe Tunnel Area 1: vehicle inside the Safe Tunnel Area I: vehicle inside intermediate area |

In table 8 the parameters of the de-registration response message M11 are shown:

TABLE 8

| Field Name | Size octets | Type | Description |
|---|---|---|---|
| Command Length | 2 | Integer | Define the overall length of the registration request message |
| Message type | 4 | Integer | 0x00040002 |

From the above description is thus apparent that the method and system for identification and registration of a moving object entering into a pre-determined area just described takes advantage of exploiting standard technologies both for the short range communication link and for the long range communication link. For the latter, a public mobile telecommunication network can be used. Apparatuses and structures for implementing the invention are thus easy to find on the market and their diffusion ensures low compatibility problems.

The arrangement described herein enables complete automation and an approach to the communication between a moving object and a remote control center of a generalized type. Pre-loading and, subsequently, uploading vehicle identification data at the control center or, vice versa, pre-loading the control center identification data for use by the vehicle are completely avoided. Management of the procedures both on the vehicle and on the control center side is thus greatly simplified, even if bi-directional and complex communication between the vehicle and the control center is established in an automatic way.

The arrangement described herein allows the control center to determine with certainty when a vehicle enters or exits the predetermined monitored area.

A further advantage is given by the use of Bluetooth, or any other short range communication technology: this is independent of any GPS operation and/or accuracy problems and guarantees security and confidentiality of the exchanged data. Thus identification and registration operations are independent of vehicle pre-loaded maps or other instruments related to variable parameters, in particular related to the territory conformation.

The communication technologies mentioned in the foregoing can be substituted by other communication links, either standard or private suitable for operating in association with a method for identification and registration of a moving object, such as a vehicle, entering a pre-determined area to be monitored, said identification operation comprising an interaction between said moving object and an area access system associated to said predetermined area and comprising supplying identification information (VID, TCC_ID, TAT), said registration operation being carried out over a wireless communication link (LT) to a control center (CC), such a method also comprising the steps of identifying said moving object (V) through a mutual interaction between said moving object (V, VM) and the area access system (AM), said mutual interaction being performed over a wireless short range communication link (BT); and performing said registration operation by establishing (GP) a wireless communication link (LT) of the long-range type between said moving object (V, VM) and said control center (CC), upon activation of said mutual interaction on the wireless short range communication link (BT).

By way of example, for the long range communication link, a UMTS network instead of the GPRS network can be used. As for the short range communication link, other protocols such as Wi-Fi 802.11a/b/g, 802.16a, HYPERLAN2, DSRC, ISO/TC 204 CALM, and so on can be used instead of the Bluetooth link. Moreover, e-tags (electronic tags), also known as RFID (Radio Frequency Identification), can also be used for the short range communication link. In this case, a passive or active e-tag can be used on board the vehicle, a suitable e-tag reader being associated with the barrier.

The arrangement described herein can be advantageously applied to the management of vehicles crossing a road tunnel. However, they can be also implemented in other similar applications, e.g. entrance of a vehicle in public areas like car parkings or urban limited traffic areas, in which to the vehicle is given the possibility to move or stop, but always in a controlled way, or the entrance of a vehicle in private areas like a yard or garage.

An integration of the proposed system with control center operator billing systems at the barriers, or with any other toll collection system is also possible.

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method for identification and registration of a moving object entering a pre-determined area to be monitored, said identification operation comprising interaction between said moving object and an area access system associated with said predetermined area and comprising supplying identification information, said registration operation being carried out over a wireless communication link to a control center, comprising the steps of:

identifying said moving object through a mutual interaction between said moving object and the area access system, said mutual interaction being performed over a wireless short range communication link; and performing said registration operation by establishing a non-GPS wireless communication link of the long-range type between said moving object and said control center upon activation of said mutual interaction on the wireless short range communication link;

wherein said supplying identification information comprises sending moving object information;

wherein said identification operation comprises the steps of:

sending an identification request message from the area access system to the moving object, said identification request message comprising said control center address information; and sending an identification response message from the moving object to the area access system, said identification response message comprising said moving object information.

2. The method of claim 1, wherein said supplying identification information comprises the step of sending control center address information to the moving object.

3. The method of claim 2, wherein said registration operation comprises the steps of:

sending a registration request message from the moving object to the control center, said registration request message comprising said moving object information;

sending a registration response message from the control center to the moving object, said registration response message comprising an acceptance information.

4. The method of claim 3, wherein said registration request message further comprises a moving object phone number.

5. The method of claim 3 said registration response message further comprises a control center phone number and/or map information and/or prognostic feature data.

6. The method of claim 1, comprising the step of providing and managing a vehicle status parameter at the moving object, which value indicates the moving object position with respect to said predetermined area to be monitored.

7. The method of claim 1, wherein after said identification operation, the area access system sends a moving object parameters message, comprising at least part of said identification information, to the control center.

8. The method of claim 1, comprising exchanging further information messages between a driver of the moving object and the moving object.

9. The method of claim 1, further comprising a de-registration operation that comprises the steps of:

detecting the exit of the moving object from the predetermined area to be monitored through a further mutual interaction between said moving object and the area access system, said mutual interaction being performed over a wireless short range communication link;

upon activation of said detection operation, performing said de-registration operation by said moving object on said long-range communication link with said control center; and terminating said long-range communication link.

10. The method of claim 1, wherein in said registration operation, said long range wireless communication link is at least partly carried out via a wireless mobile network.

11. The method of claim 1, comprising performing an intermediate notification operation of the passage of the moving object at an intermediate barrier within said area upon activation of a further interaction on the wireless short range communication link.

12. The method of claim 11, wherein a notice of said intermediate notification operation is transmitted to said control center by said wireless communication link of the long-range type between said moving object and said control center.

13. A computer readable medium encoded with a computer program product loadable into a memory of at least one computer, the computer program product comprising software code portions capable of performing the steps of the method of claim 1.

14. A system for identification and registration of a moving object entering a pre-determined area to be monitored, wherein said moving object has associated an object communication and control module, and said pre-determined area to be monitored has associated an area access system comprising interaction modules placed at fixed points in said predetermined area, said system further comprising a control center, said control center and said object communication and control module being suitably equipped for establishing a wireless communication link, said interaction modules and said object communication and control module being configured for mutually establishing a short range communication link and performing an identification operation through a mutual interaction between said moving object and the area access system, said object communication and control module being further configured for establishing a long range non-GPS wireless communication link with said control center;

wherein said object communication and control module is configured for sending a moving object information to said area access system:

wherein said area access system is further configured for sending an identification request message to the moving object, said identification request message comprising said control center-address information;

said object communication and control module being further configured for sending an identification response message to the area access system, said identification response message comprising moving object information.

15. The system of claim 14, wherein said area access system is configured for sending a control center address information to said object communication and control module.

16. The system of claim 15, wherein:

said object communication and control module is configured for sending a registration request message to the control center, said registration request message comprising said moving object information; and said control center is configured for sending a registration response message to the object communication and control module, said registration response message comprising an acceptance information.

17. The system of claim 16, wherein said object communication and control module is configured for including a moving object phone number in said registration request message.

18. The system of claim 16, wherein said control center is configured for including in said registration response message, a control center phone number and/or map information and/or prognostic feature data.

19. The system of claim 14, wherein said object communication and control module is configured for storing and managing a moving object status parameter, which value indicates the moving object position with respect to said predetermined area to be monitored.

20. The system of claim 14, wherein the area access system comprises a further communication network for sending a moving object parameters message to the control center, after performing said mutual identification operation.

21. The system of claim 14, wherein the moving object comprises an object network for exchanging messages between an object user and said object communication and control module.

22. The system of claim 14, wherein said interaction modules comprise an exit interaction module placed at an exit point and suitably equipped for performing a further mutual interaction over said wireless short range communication link with said object communication and control module, said object communication and control module being configured for performing a de-registration operation on said long-range communication link with said control center after the completion of said mutual interaction operation, and interrupting said long-range communication link.

23. The system of claim 22, wherein said access barriers are configured also for automatic toll collection.

24. The system of claim 14, wherein said interaction modules are access barriers and said fixed points are placed substantially at the boundaries of said predetermined area.

25. The system of claim 14, wherein said predetermined area encompasses a tunnel and said access barriers are placed at a distance from the tunnel boundaries sufficient to ensure that the moving object is registered and monitored before entering said tunnel.

26. The system of claim 14, wherein said short range communication link is a Bluetooth link and said interaction modules and said object communication and control module are equipped with Bluetooth communication modules.

27. The system of claim 26, wherein said Bluetooth communication module establishes said short range communication link by performing an inquiry procedure.

28. The system of claim 14, wherein said long range wireless communication link is at least partly effected via a wireless mobile network and said control center and said object communication and control module are configured for accessing said wireless mobile network.

29. The system of claim 14, wherein said wireless mobile network is a GPRS network.

30. The system of claim 14, wherein the moving object is a vehicle.

31. The system of claim 14, wherein said interaction modules comprise at least one intermediate barrier configured for detecting the passage of the moving object and supplying to the control center information about the passage of the moving object.

32. The system of claim 31, wherein supplying to the control center information about the passage of the moving object is performed over the long range wireless link.

33. A telecommunication network comprising a system according to claim 14.

* * * * *

UNITED STATES PATENT AND TRADEMARK OFFICE

CERTIFICATE OF CORRECTION

PATENT NO. : 7,664,483 B2
APPLICATION NO. : 10/584081
DATED : February 16, 2010
INVENTOR(S) : Annoni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this

Thirtieth Day of November, 2010

David J. Kappos
*Director of the United States Patent and Trademark Office*